June 3, 1924.                                                               1,496,230
B. G. KLUGH
APPARATUS FOR SMELTING PHOSPHATIC MATERIALS
Filed Dec. 7, 1920
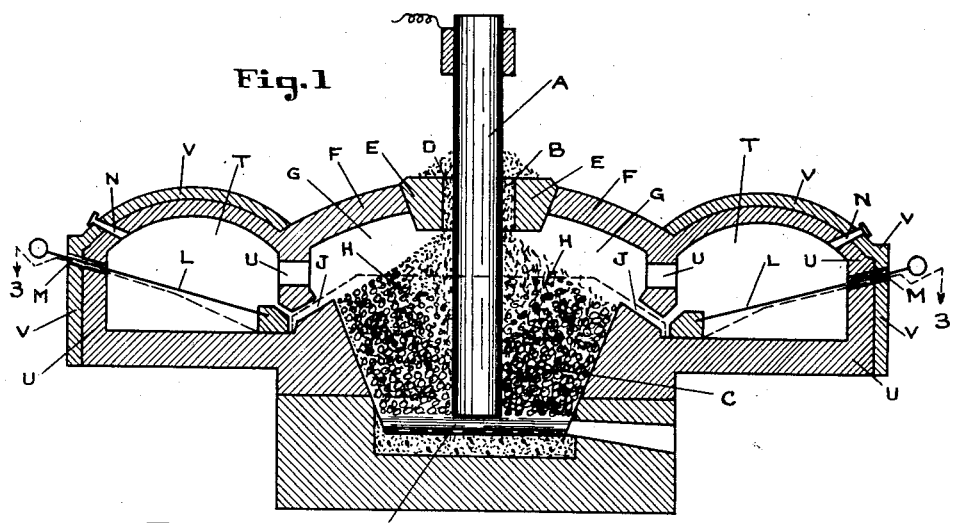
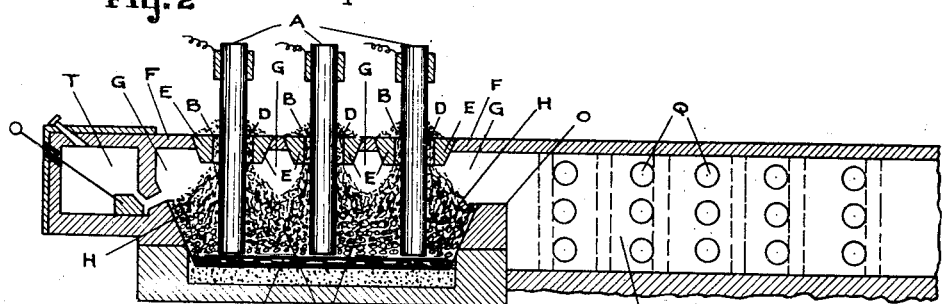
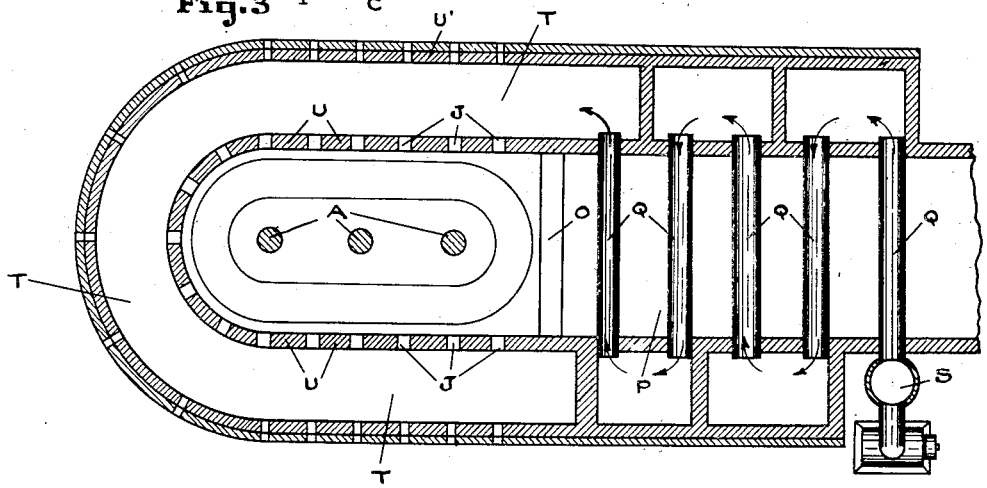
INVENTOR
B. G. Klugh.
BY
ATTORNEY Patented June 3, 1924.

1,496,230

UNITED STATES PATENT OFFICE.

BETHUNE G. KLUGH, OF ANNISTON, ALABAMA, ASSIGNOR TO FEDERAL PHOSPHORUS COMPANY, OF BIRMINGHAM, ALABAMA, A CORPORATION OF ALABAMA.

APPARATUS FOR SMELTING PHOSPHATIC MATERIALS.

Application filed December 7, 1920. Serial No. 429,017.

*To all whom it may concern:*

Be it known that I, BETHUNE G. KLUGH, a citizen of the United States of America, residing at Anniston, in the county of Calhoun and State of Alabama, have invented certain new and useful Improvements in Apparatus for Smelting Phosphatic Materials, of which the following is a specification.

This invention relates to an improvement in the electric furnace and auxiliary equipment for the smelting of phosphatic materials, and the production therefrom of phosphorus oxides.

It has for its object the provision of an apparatus for utilizing the waste heat from the combustion of the products evolved from said electric smelting operation, which arises from the necessary oxidation of said evolved products preparatory for their subsequent collection; and also the provision, in said apparatus, of simplified, economical, and workable means for controlling the said waste heat, and transferring it into the smelting stock in said electric furnace operation, thereby replacing considerable heat otherwise required to be supplied by electrical energy with subsequent saving in the latter.

In the copending application filed of even date herewith, I have stated the following results of investigations relating to the available heat units heretofore largely wasted and which this invention proposes to save as far as is practicable.

I will illustrate by thermal calculations the heat units involved in the electrical smelting of an assumed quantity of materials in the process. The chemical reaction which fulfills the conditions involved in such smelting operation is as follows:—

$$(CaO)_3P_2O_5 + 2SiO_2 + 5C = P_2 + 5CO + (3CaO)(2SiO_2).$$

The relative weights of materials involved in this equation per pound of phosphorus is as follows:

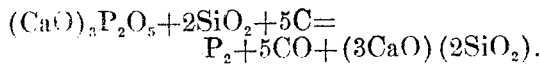

| | Pounds. |
|---|---|
| Phosphorus | 1 |
| $(CaO)_3P_2O_5$ | 5 |
| Carbon | .967 |
| $3(CaO)2(SiO_2)$ | 4.645 |
| CO | 2.250 |

The phosphorus is evolved as elemental phosphorus and the CO as such in gaseous state.

The thermal balance of the above equation and weights involved, based upon well accepted factors, shows that the net heat to be supplied for all the heat requirements is equivalent to 3966 calories. On the other hand the heat given out in the oxidation of the above weights of phosphorus and carbon monoxide evolved is equivalent to 4929 calories, or 1.24 times as much heat as is required to be furnished by electrical energy. It is obvious that any of the calories (usually wasted) from the combustion of the phosphorus and carbon monoxide, that can be absorbed by the stock in the smelting zone will replace an equivalent amount of electrical energy, and thereby result in equivalent saving in smelting costs.

I further describe in said copending application a complete and effective equipment for the transference of the waste heat units from the said combustion of phosphorus and carbon monoxide to the cold incoming stock for the electrical smelting thereof. The said transference of heat units is performed by raising the temperature of combustion of the gases in the combustion chamber overlying the successive layers of fresh stock fed into the electric furnace. The means therein described consisted, in principle, in conducting air for combustion, which had been preheated in a regenerative chamber with heat temporarily stored up from that carried out by the products of combustion, into one end of the combustion chamber overlying the stock within the furnace, thus effecting and maintaining a very high temperature within the combustion chamber, and further maintaining the heating of the said combustion air by periodically reversing the currents of incoming combustion air and outgoing products of combustion through said combustion chamber.

In my present invention, I show a different means of obtaining the same result, and provide for a continuous flow of the gases and air in one direction. While other advantages of the reversing system in the separation and collection of the products of combustion are not obtained by the herein-described apparatus, it is of simpler operation and will produce equally effective results. Certain local and special conditions will present advantageous features for either system.

Referring to the drawings:—

Fig. 1 is a vertical transverse cross section of the electric furnace and hot air supply main through any electrode.

Fig. 2 is a longitudinal vertical section of the furnace showing a hot air supply main at one end of the furnace and the recuperator chamber and pipes.

Fig. 3 is a horizontal section taken on the section line 3—3 of Fig. 1.

Similar reference numerals refer to similar parts throughout the drawings.

As illustrated, A is the electrode passing into the electric furnace through an opening B in the furnace roof and projecting down into the stock C within the furnace, said stock being delivered into said furnace through an annular space D between the electrode and the internally projecting refractory ring E, which by its projection below the roof F, provides a combustion chamber G, whose floor is formed by the top surface of the stock while in its natural angle of repose as delivered into said furnace. In the proper operation of said furnace the phosphorus and carbon monoxide will be set free toward the bottom of said furnace just above the slag zone I, and will pass upwardly through the stock emanating therefrom through said top surface H into said combustion chamber G. The said phosphorus and carbon monoxide will then be burned immediately as they reach the surface H by the current of incoming heated combustion air supplied through tuyère ports J, said required volume of air being controlled by means of valve blocks K regulated from without by rods L through sealing conduits M, and operation thereof being observed through the peep sights N. The construction of the furnace with regard to the relation of the stock feed opening D, and the said combustion air tuyère ports J, is such that the incoming combustion air is directed by said ports J at an inclination to sweep upwardly along over the top surface of the stock H, thus effecting the combustion of the phosphorus and carbon monoxide at the moment of their emergence from the top surface of said stock which produces the most intensive effect in heating the top surface of the stock, which is the freshly fed layer of cold stock. The gaseous products of combustion having thus, through their initial combustion in direct contact with the stock through which they were evolved, and also through the intense heat they maintain in the combustion chamber G, imparts the maximum heat to the stock within the furnace, pass out through outlet passage O directly into the recuperative chamber P. The highly heated gaseous products therein contact on all surfaces of the recuperator air pipes Q, through which the combustion air is being driven in a direction counter to that of the flow of said gaseous products of combustion by means of a blower R through manifold S into pipes Q. The number and area of such recuperator pipes will of course be such that the greatest quantity of heat will be extracted from the gaseous products of combustion in their path to the final treatment for separation and collection of the products to be derived therefrom. The said air for combustion passing through the pipes in the direction indicated by the arrows, shows that the cold air coming first in contact with the gas at its coolest stage and gradiently coming in contact with the gradiently hottest gases will be raised to the highest temperature possible to be derived from the combustion gases from said chamber G. Having been so heated in said pipes, the said combustion air passes into the combustion air chamber T, which is constructed integrally with the furnace proper and disposed between the common furnace side outwall U' and the combustion air chamber in-wall U, thus providing for the absorption of the heat radiated through wall U by the incoming combustion air which returns said radiated heat to the furnace. The said combustion air chamber T is enclosed with the best available heat insulating materials V to avoid all possible loss of heat therethrough. Said combustion air chamber extends over the maximum area of the surface of the sides of the combustion chamber and is provided with a multiplicity of tuyère ports J for the uniform admission of the heated combustion air to the entire interior space of the said combustion chamber. Each tuyère port is provided for the regulation of the correct volume of air to be passed therethrough with simple and effective valve means such as the blocks K, hereinabove described.

In operation, the correct total pressure and volume of air for the combustion of the phosphorus and carbon monoxide will be readily controlled by means of the blower R and the distribution over the surface of the stock of said air may be accurately regulated by the valve blocks K.

Furthermore, the construction of the furnace as shown presents reciprocal advantages toward the purpose of carrying out the principles of my present invention. The cross section of the furnace with the walls tapered inwardly toward the bottom or slag zone, shows the distance from said slag zone to the marginal top surface of the stock less than that from said slag zone to the apex of the stock which is adjacent to the electrode. The tendency will be for the coarser stock to roll toward the outside of the furnace, thus causing a more open column of stock to be formed nearer the side walls of said furnace than about the electrode. In fact the percentage of open space, as voids, in said stock increases gradiently in the section of the furnace. The tapered bottom has the further advantage of providing a wider top surface area for the emanation and combustion of the gases and for the transfer of heat to the stock, it increases the tendency of the larger coarser particles of stock to roll away from the vertical axis of the stock column in which axis the finest particles, including the carbon in finely divided state, will remain and be to a great extent covered and protected from combustion by the overlying larger particles, and finally, as the stock works down through the furnace, it is gradually drawn back towards the center and then comes properly into relation with the carbon at the center of the column. In usual electric smelting practice the tendency of the gases from the reducing zone to pass upward immediately adjacent to the electrode, due largely to the movement of said electrode, is a very troublesome feature and requires considerable "poling" and "working" in order to cause the gases from the reducing zone to pass out of the stock in sections away from that adjacent to the electrode. This troublesome feature is automatically corrected in the hereindescribed furnace construction, because said construction restricts the stock feeding method to that which causes the stock within the furnace to assume its most advantageous operating arrangement. Therefore since the gases from the reducing zone pass upwardly and out of the stock their flow will be largely towards the outside of the furnace on account of lower resistance thereto of the coarser matter in the column therebelow, and since the heated air for combustion of said gases is delivered thereto at the nearest point to the said gas emergence from the surface of said stock, the combustion will thereby be most efficient and conducive to the heating of the cold fresh incoming stock as fed and delivered over the area of said top surface of stock within the furnace.

This invention is not intended to be restricted in scope to the specific embodiments shown, but contemplates such modifications as come within the spirit and scope of the claims.

Having thus described my invention, what I claim as new and desire to secure by Letters Patent, is:—

1. An apparatus of the character described, comprising an enclosed electric furnace with a combustion chamber for combustion of evolved gases therein, and an air chamber contiguous thereto, said air chamber communicating with said combustion chamber by means of multiplicity of port openings, uniformly arranged for distribution of said air about said combustion chamber.

2. An apparatus of the character described, comprising an enclosed electric furnace with a combustion chamber for combustion of evolved gases therein, an air chamber contiguous thereto, said air chamber communicating with said combustion chamber by means of multiplicity of port openings uniformly arranged for distribution of said air about said combustion chamber, and valving means for said port openings to individually control the admission of air therethrough.

3. In an enclosed electric furnace for smelting phosphatic material, means providing a combustion chamber above the stock, an air chamber about the combustion chamber, and means to cause the stock in said combustion chamber to assume an angle of repose towards said air chamber, there being air admission ports between said chambers adjacent to the top marginal outer edge of the stock pile.

4. In an electric smelting furnace, an enclosing roof disposed to provide a combustion chamber and having a stock admission port through which the column of stock enters freely to assume an angle of repose towards the marginal walls of the furnace, and an air chamber about said marginal walls having a multiplicity of ports arranged adjacent to the marginal edge of the top surface of the stock.

5. In an electric smelting furnace, an enclosing roof disposed to provide a combustion chamber and having a stock admission port through which a column of stock enters free to assume an angle of repose towards the marginal walls of the furnace, and an air chamber about said marginal walls having a multiplicity of ports arranged adjacent to the outer marginal edge of the top surface of the stock, said ports being arranged in a plane substantially parallel with said top surface of said stock.

6. In an electric smelting furnace, an enclosing roof disposed to provide a combustion chamber and having a stock admission port through which the columns of stock enter and are free to assume an angle of repose towards the marginal walls of the furnace, an air chamber about said marginal walls having a multiplicity of ports arranged adjacent to the outer marginal edge of the top surface of the said stock, said ports being arranged and inclined in a plane juxtaposed to and substantially parallel with said top surface of said stock, and means to control the volume of air flowing through said ports without modifying its direction.

7. An electric furnace having an enclosing roof disposed to provide a combustion chamber therein and having an overhead opening for the electrode and for the feed of stock, there being air inlet ports entering the combustion chamber about and adjacent to the outer margin of the top surface of the stock therein, the walls of the furnace below said openings being convergent, as and for the purposes described.

8. The combination with an enclosed electric furnace having its electrodes within the furnace surrounded by the entering stock, of an air chamber surrounding the side walls of the furnace and communicating therewith, and means to utilize the waste heat of said electric furnace to preheat the air admitted to said chamber.

9. The combination with an enclosed electric furnace having its electrodes within the furnace surrounded by the entering stock, a heat recuperative apparatus adjacent thereto, means to pass the evolved or burning gases of said electric furnace through said apparatus, means to pass the air supply for the furnace through said apparatus to preheat it, and means to deliver the preheated air into the combustion chamber in said electric furnace.

10. The combination with an enclosed electric furnace having its electrodes within the furnace surrounded by the entering stock, a heat recuperative apparatus adjacent thereto, means to pass the furnace gases through said apparatus, means to pass the air supply for the furnace through said apparatus to preheat it, and means to deliver the preheated air into the combustion chamber in the furnace through ports which are distributed about its entire outer marginal side wall except that portion forming the entry to the recuperative apparatus.

11. An enclosed electric furnace having a gas outlet port, a heat recuperative apparatus into which said port opens, pipe means for conducting air through said recuperating apparatus to preheat it, a chamber which receives said preheated air and which extends around the side walls of the furnace from side to side of said port and has air ports for distributing the preheated air into the combustion chamber of the furnace.

12. An enclosed electric furnace having a gas outlet port, a heat recuperative apparatus into which said port opens, pipe means for conducting air through said recuperating apparatus to preheat it, and a chamber which receives said preheated air and which extends around the side walls of the furnace from side to side of said outlet port and has air ports for distributing the preheated air into the combustion chamber adjacent to and in line with the top surface level of the stock therein.

13. An enclosed electric furnace having a gas outlet port, a heat recuperative apparatus into which said port opens, pipe means for conducting air through said recuperating apparatus to preheat it, and a hot air supply chamber extending around the side walls of the furnace from side to side of said outlet port and having air ports for distributing the preheated air into the combustion chamber adjacent to and in line with the tapered top surface of the stock therein, and means to regulate individually the flow of air through each of said ports.

14. An enclosed electric furnace having means to introduce from above a column of descending stock, a bottom which diverges upwardly from the fusion zone to increase the exposed top surface area of the stock column, and means to admit air to the combustion chamber above the stock in the furnace.

15. An enclosed electric furnace as described in claim 14, in which means are provided to preheat the air, and in which the air admission means are disposed to cause the air to flow upwardly over the stock from the outer marginal edge of its top surface.

In testimony whereof I affix my signature.

BETHUNE G. KLUGH.

Witness:
NOMIE WELSH.